United States Patent
Stouff et al.

(10) Patent No.: US 11,214,873 B2
(45) Date of Patent: Jan. 4, 2022

(54) PROCESS FOR THE MANUFACTURING OF A STEEL STRIP FOR PACKAGING AND ASSOCIATED EQUIPMENT

(71) Applicant: ArcelorMittal, Luxembourg (LU)

(72) Inventors: Mathias Stouff, Saint-Ferreol-D'Auroure (FR); David Glijer, Metz (FR); Guillaume Lequippe, Compiegne (FR); Thibault Leclerc, Metz (FR); Marc Friedrich, Lorry les Metz (FR); Thierry Marquais, Gouvieux (FR)

(73) Assignee: ArcelorMittal, Luxembourg (LU)

( * ) Notice: Subject to any disclaimer, the term of this patent is extended or adjusted under 35 U.S.C. 154(b) by 112 days.

(21) Appl. No.: 16/418,530

(22) Filed: May 21, 2019

(65) Prior Publication Data
US 2019/0330744 A1    Oct. 31, 2019

Related U.S. Application Data

(62) Division of application No. 15/310,719, filed as application No. PCT/IB2014/000745 on May 16, 2014, now Pat. No. 10,337,106.

(51) Int. Cl.
*C23C 22/73* (2006.01)
*B05C 1/08* (2006.01)
(Continued)

(52) U.S. Cl.
CPC .......... *C23C 22/73* (2013.01); *B05C 1/0817* (2013.01); *B05C 1/0834* (2013.01); *B05D 1/28* (2013.01);
(Continued)

(58) Field of Classification Search
CPC .................. C23C 22/73; B05C 1/0817
See application file for complete search history.

(56) References Cited

U.S. PATENT DOCUMENTS

| 5,555,756 A | 9/1996 | Fischer et al. |
| 2010/0007687 A1* | 1/2010 | Kariya ................ B41M 5/0017 347/14 |

(Continued)

FOREIGN PATENT DOCUMENTS

| CN | 201669194 U | 12/2010 |
| CN | 103537401 A | 1/2014 |

(Continued)

OTHER PUBLICATIONS

"Anilox Guide for Offset Coating Applications," Harris & Bruno International, 2011, downloaded from https://www.harris-bruno.com/uploads/H_B_Anilox_Guide.pdf.
T.A. Turner, "3.3.4® Anilox coating systems", Canmaking: The Technology of Metal Protection and Decoration, 1998), pp. 89-91.
Technical Data Sheet BONDERITE M-NT 1456 (Jan. 2017).

*Primary Examiner* — Nathan T Leong
(74) *Attorney, Agent, or Firm* — Davidson, Davidson & Kappel, LLC

(57) ABSTRACT

An apparatus for the implementation of a process for the continuous manufacturing of steel strips for packaging coated with a passivation layer is provided. An apparatus contains a transfer roller; a coating roller contacting the transfer roller, a surface of the coating roller having a plurality of hexagonally shaped cells with a line count being from 50 to 200 lines per centimeter and a volume being from $5 \cdot 10^{-6}$ to $10 \cdot 10^{-6}$ m³ per square meter of the coating roller surface; and a tank containing an aqueous passivation solution, the tank providing the aqueous passivation solution to the coating roller.

20 Claims, 4 Drawing Sheets

(51) Int. Cl.
  *C23C 22/00* (2006.01)
  *C23C 22/36* (2006.01)
  *C23C 22/77* (2006.01)
  *G01B 7/06* (2006.01)
  *B05D 1/28* (2006.01)
  *C23C 22/30* (2006.01)
  *C23C 22/78* (2006.01)
  *C23C 22/82* (2006.01)
  *F26B 3/04* (2006.01)
  *F26B 15/10* (2006.01)
  *G01B 11/06* (2006.01)

(52) U.S. Cl.
  CPC .............. *C23C 22/00* (2013.01); *C23C 22/30* (2013.01); *C23C 22/361* (2013.01); *C23C 22/77* (2013.01); *C23C 22/78* (2013.01); *C23C 22/82* (2013.01); *F26B 3/04* (2013.01); *F26B 15/10* (2013.01); *G01B 7/10* (2013.01); *G01B 7/107* (2013.01); *C23C 2222/10* (2013.01); *C23C 2222/20* (2013.01); *G01B 11/0683* (2013.01); *G01B 11/0691* (2013.01)

(56) References Cited

U.S. PATENT DOCUMENTS

| | | | |
|---|---|---|---|
| 2010/0183188 A1* | 7/2010 | Straehle | G01B 11/0675 382/100 |
| 2010/0221438 A1 | 9/2010 | Karlsson | |
| 2010/0224286 A1* | 9/2010 | Bertkau | B05C 1/0817 148/253 |
| 2011/0017352 A1 | 1/2011 | Vandermeulen et al. | |

FOREIGN PATENT DOCUMENTS

| | | | |
|---|---|---|---|
| FR | 1559253 | * | 3/1968 |
| FR | 1559253 | A | 3/1969 |
| FR | 2330464 | A1 | 6/1977 |
| GB | 1472709 | A | 5/1977 |
| JP | H03177578 | A | 8/1991 |
| JP | H05115832 | A | 5/1993 |
| JP | H08245973 | A | 9/1996 |
| JP | H10204653 | A | 8/1998 |
| JP | 2004089796 | A | 3/2004 |
| JP | 2009057585 | A | 3/2009 |
| KR | 1020110077167 | A | 7/2011 |
| WO | 2010137001 | A2 | 12/2010 |

* cited by examiner

Figure 3A –

PROCESS FOR THE MANUFACTURING OF A STEEL STRIP FOR PACKAGING AND ASSOCIATED EQUIPMENT

This is a Divisional of U.S. application Ser. No. 15/310,719, filed Nov. 11, 2016, which is a National Phase Application of International Application No. PCT/M2014/000745, filed May 16, 2014, the entire disclosures of which are hereby incorporated by reference herein.

This invention relates to a process for the continuous manufacturing of steel strips for packaging coated with a passivation layer and equipment that makes it possible to implement this process.

BACKGROUND

The terminology "steel for packaging" includes all steel-based materials used for the packaging of food products, beverages and industrial non-food products such as aerosol gases or paint.

Packaging steels include, among other things, tin plate, which is steel having low carbon content, generally less than 0.08%, covered by a layer of tin.

A passivation layer is applied after the deposition of the tin, and makes it possible, among other things, to limit the development of tin oxides. The passivation can be accomplished by depositing an aqueous passivation solution such as a phosphating or chrome plating solution or a solution of soluble compounds such as titanium oxalate, titanium sulfate or zirconium sulfate. The deposit is first applied in the form of a wet film, wherein the solution is in aqueous form, and then the coated product is dried to obtain a dry film. The drying is generally performed by passing the coated strip through a tunnel equipped with nozzles that spray hot air in the direction of the strip. The thickness of the wet film deposited is generally less than 5 µm, for a dry passivation coating thickness less than 10 nm. Indeed, the passivation coating is mechanically weak and the greater its thickness, the higher the risk of cohesive fracture. This cohesive fracture results in delamination or loss of adherence of organic coatings, such as varnishes or paints, which may be applied later.

The passivation layer may be deposited by a "spray/dip/squeeze" method, according to which the surface to be coated is placed in contact with the aqueous passivation solution by spraying or by immersion, after which the excess solution is eliminated with the aid of a squeeze roller. The disadvantage of this method is that the thickness of the wet film deposited is not a function of the quantity of solution placed in contact with the strip but on the speed of the coating line. The quantity of solution removed with the aid of the squeezing rollers is notably a function of the speed at which the strip travels between these rollers. Consequently, with this method it is difficult to obtain a uniform thickness of the passivation layer, regardless of the speed of the line.

Another method for the deposition of a passivation layer includes spraying the aqueous passivation solution on the strip in the form of a uniform flow of droplets generated by rotating discs, and then smoothing out the passivation layer with the aid of a spreader roller. This method has the advantage that the thickness of the wet film deposited can be kept constant even in the event of a variation in the speed of the line by adjusting the flow of solution sprayed by the rotating discs. However, the uniform spreading of the solution depends to a great extent on the time necessary for the drops to form a uniform liquid stream and on the contact force between the spreader roller and the strip, which is not easy to control due to the wear of the rollers, variations in the flatness of the strip and tolerances in the geometry and alignment of the rollers. Therefore, there are defects in the uniformity of the thickness of the passivation layer that are unacceptable for packaging applications.

To eliminate these problems of uniformity it is possible to increase the quantity of solution sprayed by the rotating discs, but it leads to a higher average thickness of the wet film which in turn causes drying problems. Indeed, an increased quantity of water must be evaporated to achieve the required dry thickness of the passivation layer and to eliminate the presence of residual moisture on the strip. One possibility is then to increase the time it takes the strip to pass through the drying installation by slowing down the line, which poses productivity problems, in particular for this type of manufacturing line which generally operates at a speed greater than or equal to 400 m/min.

Another solution could be to increase the length of the drying unit, but that causes space problems on the line. Another possibility includes increasing the temperature of the air blown toward the strip, although this increase results in an increase in the energy consumption and a deterioration of the passivation solution.

BRIEF SUMMARY

The purpose of the invention is to provide a process that does not have the disadvantages described above. An object of the present invention is therefore in particular to provide a process allowing the deposition of a passivation layer having a constant thickness, regardless of the speed of the manufacturing line.

The present invention provides a process for the continuous manufacturing of steel strips for packaging coated with a passivation layer in which a layer of aqueous passivation solution, the thickness of which is less than 3 µm and the viscosity of which is less than $1.5 \cdot 10^{-3}$ Pa·s at 20° C. This deposit is carried out by means of a transfer roller in contact with the strip and with a second coating roller, the surface of which has a plurality of hexagonally shaped cells, the line count of which is between 50 and 200 lines per centimeter, and the total volume of which is between $5 \cdot 10^{-6}$ and $10 \cdot 10^{-6}$ m$^3$ per square meter of roller surface. The coating roller is supplied with aqueous passivation solution by dipping in a tank equipped with wiping means and wherein the runs at a speed greater than or equal to 400 m/min.

This manufacturing process can also include the following characteristics described in, considered individually or in combination:
  the total force exerted on the coating roller to place it in contact with the transfer roller is between 1500 N and 3000 N per meter of width of coated steel strip;
  the total force exerted on the transfer roller to place it in contact with the steel strip is between 3000 and 5000 N per meter of width of coated steel strip;
  the coating roller is in contact with wiping means allowing elimination of the excess aqueous passivation solution at the exit from the tank;
  after the deposition of the aqueous passivation solution, the coated strip is subjected to a drying step;
  the drying step is carried out by blowing air in the direction of the strip, wherein the blown air has a temperature between 80 and 150° C. and a moisture content of less than 15;
  prior to the drying stage, the strip is subjected to a pre-heating step to a temperature inferior to 80° C.;

the concentration of the passivation element in the aqueous solution is controlled as a function of a measurement of the thickness of the passivation film before drying;

wherein the aqueous passivation solution is an aqueous solution of Bonderite® 1456, wherein the concentration of the solution is between 5 and 15% by volume of a commercial solution of Bonderite® 1456; and/or the thickness of the layer of Bonderite® 1456 deposited is less than 15 nm after drying.

The present invention further provides an apparatus for the implementation of a method including a transfer roller, a coating roller in contact with the transfer roller, and having a plurality of hexagonally shaped cells, the line count of which is between 50 and 200 lines per centimeter, and the volume of which is between $5 \cdot 10^{-6}$ and $10 \cdot 10$ m$^3$ per square meter of roller surface and a tank containing an aqueous passivation solution and in which the coating roller is dipped.

This apparatus can also include the following characteristics, considered individually or in combination:

the transfer roller is made of elastomer;
the coating roller includes a laser etched ceramic coating;
the tank includes a wiping device having at least one blade; and/or
further including magnetic radiation gauges allowing measurement of the thickness of the film of aqueous passivation solution before drying;

Additional characteristics and advantages of the invention are described in greater detail below.

BRIEF DESCRIPTION OF THE DRAWINGS

To illustrate the invention, tests have been carried out and will be described by way of non-restricting examples, in particular with reference to the accompanying figures, in which:

FIGS. 3A and 3B are photographs taken using a SIMS device of passivation films deposited respectively using a method of the prior art and a method according to the invention.

DETAILED DESCRIPTION

Figure 1:
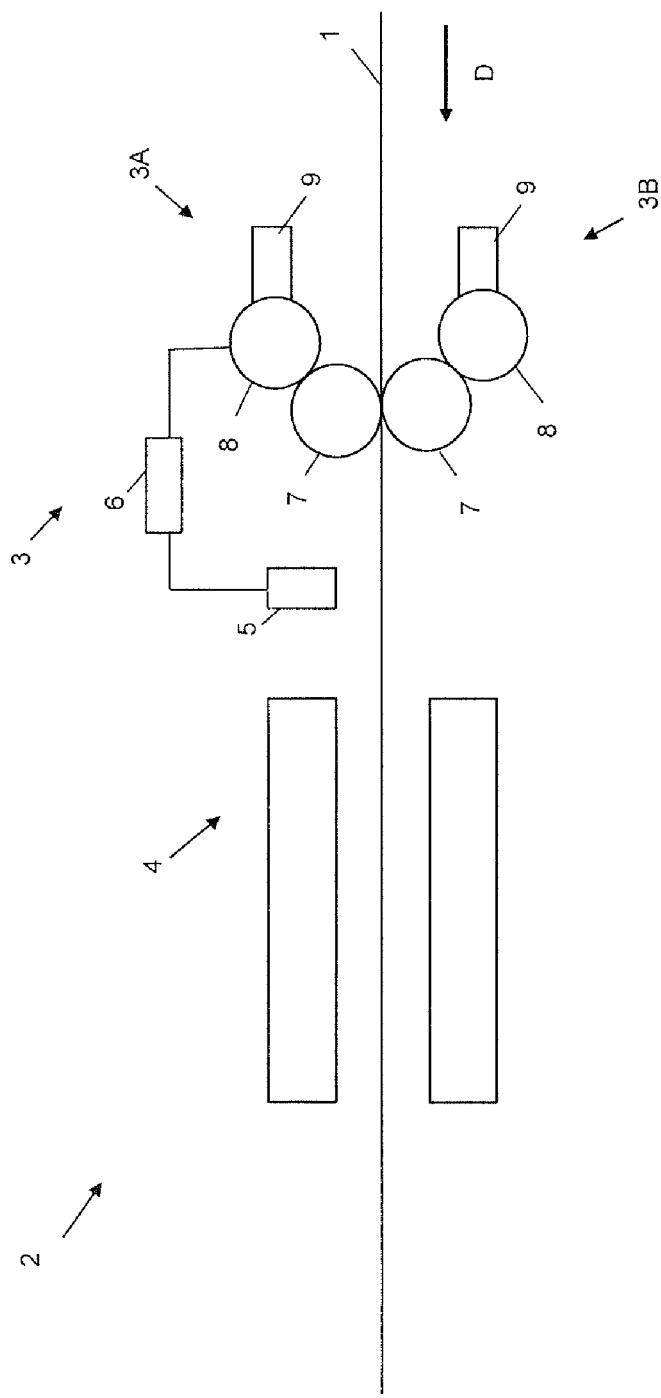
FIG. 1 shows manufacturing equipment for a steel strip for packaging according to an embodiment of the invention.

FIG. 1 shows a steel strip 1 advancing through a coating installation 2, along direction D. The strip 1 first runs through a coating device 3, the purpose of which is to apply a wet film of aqueous passivation solution, then through a drying unit 4, the purpose of which is to eliminate the moisture contained in this wet film. A device 5 that measures the thickness of the wet film deposited is located between the coating device 3 and the drying unit 4 and is connected to a control unit 6 of the coating device 3.

In the embodiment illustrated in FIG. 1, the coating device 3 is capable of coating the two faces of the strip simultaneously, but in an alternative embodiment the coating device 3 can be made up only of the top half 3A or of the bottom half 3B of the device so that it only coats a single face of the strip.

Figure 2:
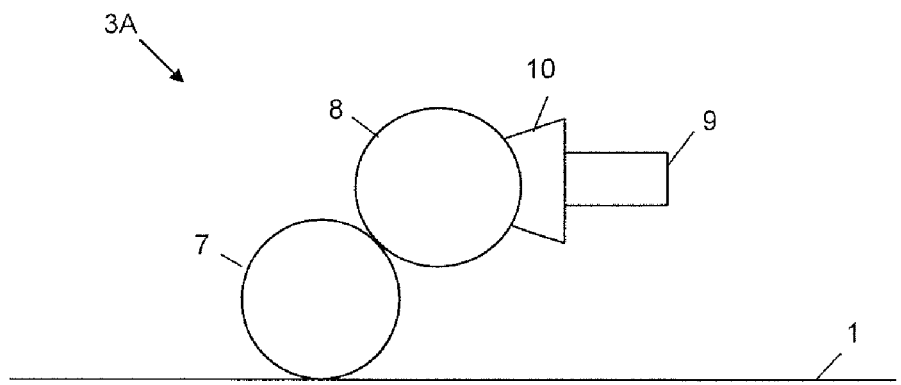
FIG. 2 illustrates a coating device according to an embodiment of the invention.

One embodiment of the upper part 3A of the coating device 3 is illustrated in FIG. 2. The lower part 3B is not described because it is symmetrical to the upper part 3A with reference to the strip 1.

This device is made up of a first roller, which is called a transfer roller 7. This transfer roller 7 is in contact on one hand with the strip 1 and on the other hand with a second roller, which is called a coating roller 8. The coating roller 8 is in contact with the transfer roller 7 and with a tank 9 containing the aqueous passivation solution to be deposited on the strip 1. In the embodiment illustrated in FIG. 2, the tank 9 is equipped with a device 10 that squeezes the solution on the surface of the coating roller 8.

During the manufacturing process, the coating roller 8 is in rotation and is dipped in the tank 9 containing the aqueous passivation solution. This aqueous solution has a viscosity close to that of the water, and less than $1.5 \cdot 10^{-3}$ Pa·s at 20° C. The solution in question can be, for example, an aqueous solution of silane, trivalent chromium or an aqueous solution of Bonderite®. The coating roller 8 can rotate either in the clockwise direction or in the opposite direction.

According to the invention, the coating roller 8 has a plurality of hexagonally shaped cells, the line count of which is between 50 and 200 lines per centimeter, and the volume of which is between $5 \cdot 10^{-6}$ and $10 \cdot 10^{-6}$ m$^3$ per square meter of roller surface, and preferably between $5 \cdot 10^{-6}$ and $7 \cdot 10^{-6}$ m$^3$ per square meter of roller surface.

These etched characteristics of the coating roller 8 make it possible to deposit the quantity of aqueous passivation solution required to obtain the required thickness of wet passivation film evenly over the entire surface of the strip.

The cells of the coating roller 8 are filled with aqueous passivation solution. The wiping device 10 makes it possible to ensure that the roller 8 is coated with the necessary quantity of solution to be deposited to obtain the required wet film thickness. This device 10 can be made up of two blades, for example, the first blade being located at the point where the roller 8 enters the tank 9 and makes it possible to remove residual aqueous solution remaining from the preceding passage of the roller 8 through the tank 9, and the second blade being located at the point where the roller 8 exits the tank 9, and makes it possible to remove the excess solution. The first blade can be made of plastic, for example, and the second blade can be made of stainless steel or carbon fiber. The device 10 can also be a single blade, for example, a blade made of stainless steel, located at the point where the roller 8 exits the tank 9.

The surface of the coating roller 8 can be made of ceramic, for example, and the cells can be etched with the aid of a laser or mechanical tooling, for example.

After passage through the tank 9, the surface of the coating roller 8 coated with aqueous solution comes into contact with the transfer roller 7, which is itself driven in a direction of rotation that is opposite to the one of the coating roller 8.

The transfer roller 7, or at least its surface, is preferably made of a material that makes possible an optimum transfer of the solution, i.e. a transfer that minimizes the losses of solution due, for example, to absorption by the material of which the roller or its surface is made, or on the contrary by excessive slippage of the solution over the surface of the roller. This material can also exhibit resistance to chemical corrosion resistance as well as to mechanical wear. The transfer roller 7 is made of elastomer, for example, and preferably of chlorosulfonated polyethylene or Hypalon®.

The contact pressure between the coating roller 8 and the transfer roller 7 must be sufficient to transfer the aqueous passivation solution from the coating roller 8 to the transfer roller 7, although it must not be so great that it causes splashing which can result in losses of solution and therefore a non-optimal transfer of the solution. This pressure between the two rollers 7, 8 can be applied, for example, with the aid of a cylinder mounted on the coating roller 8. The total force $F_{RR}$ applied to the roller 8 is preferably between 1500 and 3000 N per meter of width of the strip 1.

Following this contact, the transfer roller 7 is coated with the aqueous passivation solution which is to be deposited on the strip 1.

The contact pressure between the transfer roller 7 and the strip 1 must not be too great, at the risk of wiping off too much of the wet passivation solution film deposited, nor too low, at the risk of insufficiently wetting the strip with the solution. Moreover, a minimum pressure must be exerted by the roller on the strip to compensate for potential flatness defects in the latter. This pressure between the transfer roller 7 and the strip 1 can be applied, for example, with the aid of at least one cylinder mounted on the transfer roller 7. The total force $F_{TB}$ applied to the roller 7 is preferably between 3000 and 5000 N per meter of width of the strip 1.

The speed of rotation of the transfer roller 7 and of the coating roller 8 can be synchronized with the speed of displacement of the strip 1.

In one embodiment of the invention, the thickness of the wet film of passivation layer deposited is measured with the aid of the thickness-measuring device 5. If the measured thickness is less than a target thickness, the concentration of the aqueous solution in the tank 9 is increased or vice-versa.

In addition, or in an additional embodiment of the invention, the speed of rotation of the coating roller 8 can be controlled by the control unit 6 illustrated in FIG. 1. This control unit 6 is connected to the device 5 that measures the thickness of the wet film of passivation coating. If the thickness is less than a target thickness, the speed of the coating roller 8 is increased and vice-versa.

The thickness can be measured, for example, with the aid of an electromagnetic radiation gauge. These gauges are preferably installed as close as possible to the coating device 3 because the moisture evaporates from the film very quickly, which can cause a significant variation in the measurements.

The thickness of the wet passivation film deposited is generally less than 3 µm, preferably less than 1.5 µm.

Following the step of the deposition of the aqueous passivation layer, the strip is subjected to a drying step. This drying step is carried out with the aid of a drying device 4.

This device 4 is, for example, a drying tunnel equipped with nozzles that spray air in the direction of the coated strip at a temperature between 80 and 190° C. The air is sprayed at a temperature preferably between 80 and 150° C. and has a moisture content of less than 15%. Controlling the moisture content of the sprayed air makes it possible to reduce the temperature of the air used, which represents savings in terms of the energy used to heat the air as well as an advantage in terms of reducing the risk of damage to the passivation layer. This control can be carried out, for example, with the aid of extraction nozzles located in multiple locations in the tunnel.

Following this drying phase, the thickness of the dry passivation film is generally less than 15 nm, preferably less than 8 nm.

In another embodiment, not illustrated, the strip can be subjected, prior to the drying step, to a pre-heating step, to a temperature below 80° C. This pre-heating step can be carried out, for example, with the aid of an induction heater or infrared radiation.

Figure 3B:
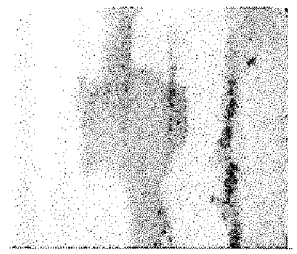
Figure 3B:
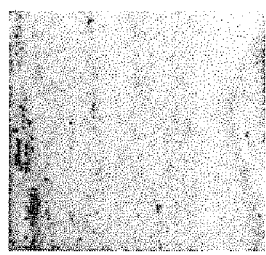

FIGS. 3A and 3B are photographs taken using a secondary ionization mass spectrometer or SIMS.

The two photographs show the deposit of an aqueous solution of Bonderite® 1456 on tin plate steel. In both cases, the speed of the line, the concentration of the aqueous solution of Bonderite® 1456 and the drying process are identical. In the first case, photograph 3A, the Bonderite® 1456 has been deposited with the aid of the rotating disc method of the prior art as described above. In the second case, photograph 3B, it has been deposited by the method according to the invention.

In these two photographs, it is significant that, the darker the areas, the higher the concentration of Bonderite® 1456 and thus the thickness of the passivation coat deposited. FIG. 3A shows dark areas characteristic of an uneven passivation coat on the surface of the test piece, while no such areas are observed in FIG. 3B. The method according to the invention therefore makes it possible to obtain a constant thickness of the passivation layer, which is not the case with the method of the prior art.

Figure 4:
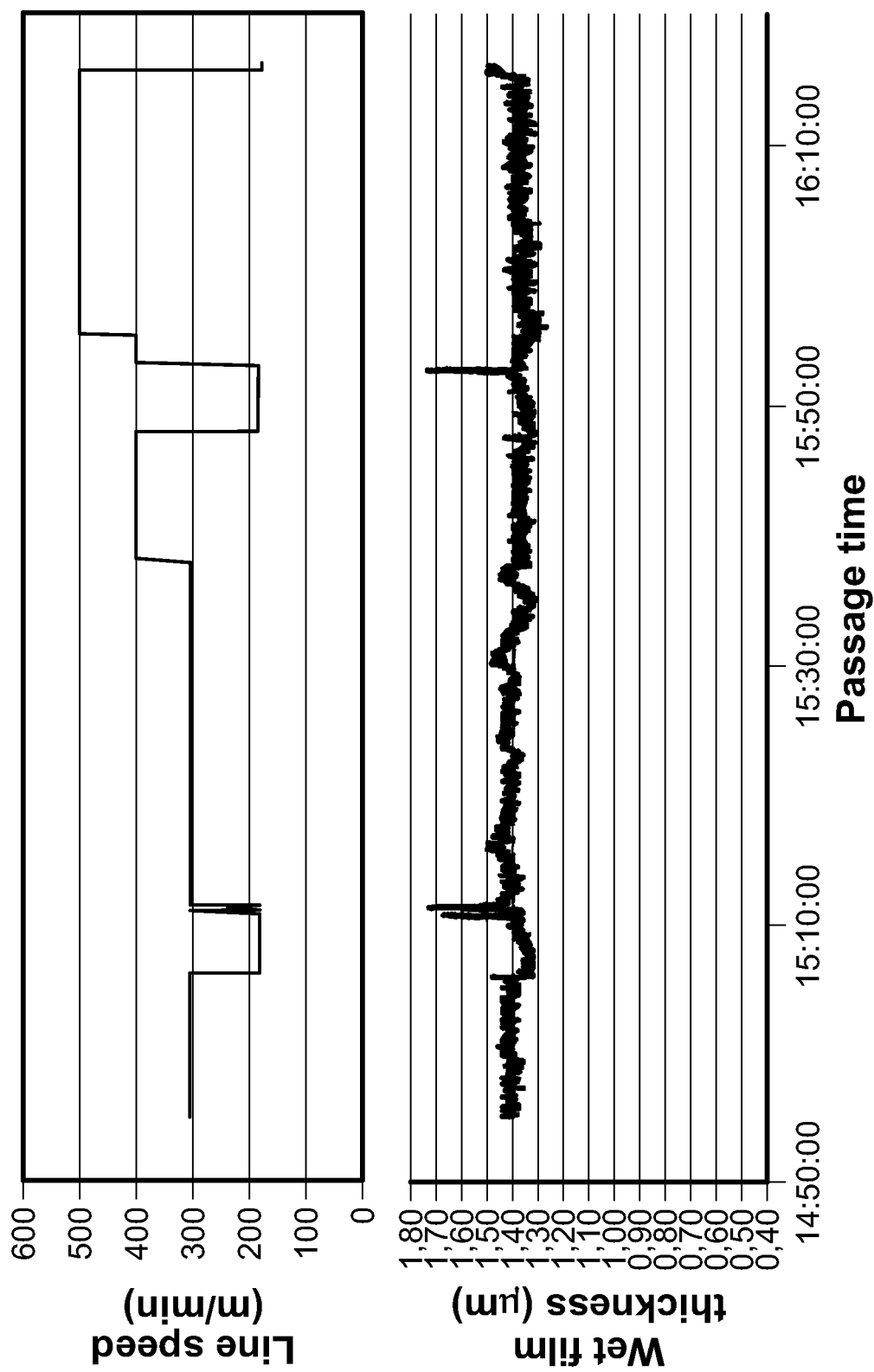
FIG. 4 is a double graph, the first graph illustrating the speed of the manufacturing line as a function of time and the second illustrating the thickness of the wet passivation film as a function of the same period of time.

FIG. 4 includes two graphs. The first shows the speed of a manufacturing line according to the invention as a function of time. The second shows the thickness of the wet passivation film deposited on this manufacturing line as a function of time.

The manufacturing line used for this test includes a coating allowing deposition of an aqueous passivation solution on the top face of the steel strip. This coating device is made up of a transfer roller made of Hypalon®, a coating roller, the surface of which is made of ceramic and includes a plurality of hexagonally shaped cells spaced at approximately 160 lines per centimeter, and the total volume of which is 7.5·10 m³ per square meter of roller surface. This coating roller is dipped into a tank containing an aqueous solution of Bonderite® 1456 at a concentration of approximately 8% by volume of commercial Bonderite® 1456 solution. The tank is equipped with a wiping device having a plastic blade at the entrance to the tank and a stainless steel blade at the exit.

As shown in the first graph, the speed of the line varies from 180 to 500 m/min. The second graph shows that in spite of this speed variation, the thickness of the wet passivation film deposited remains constant at ±0.3 µm. The peaks observed correspond to the step of welding two successive strips and are disregarded.

The method according to the invention therefore makes it possible to obtain a constant thickness of the passivation coating regardless of the speed of the manufacturing line.

Figure 5:
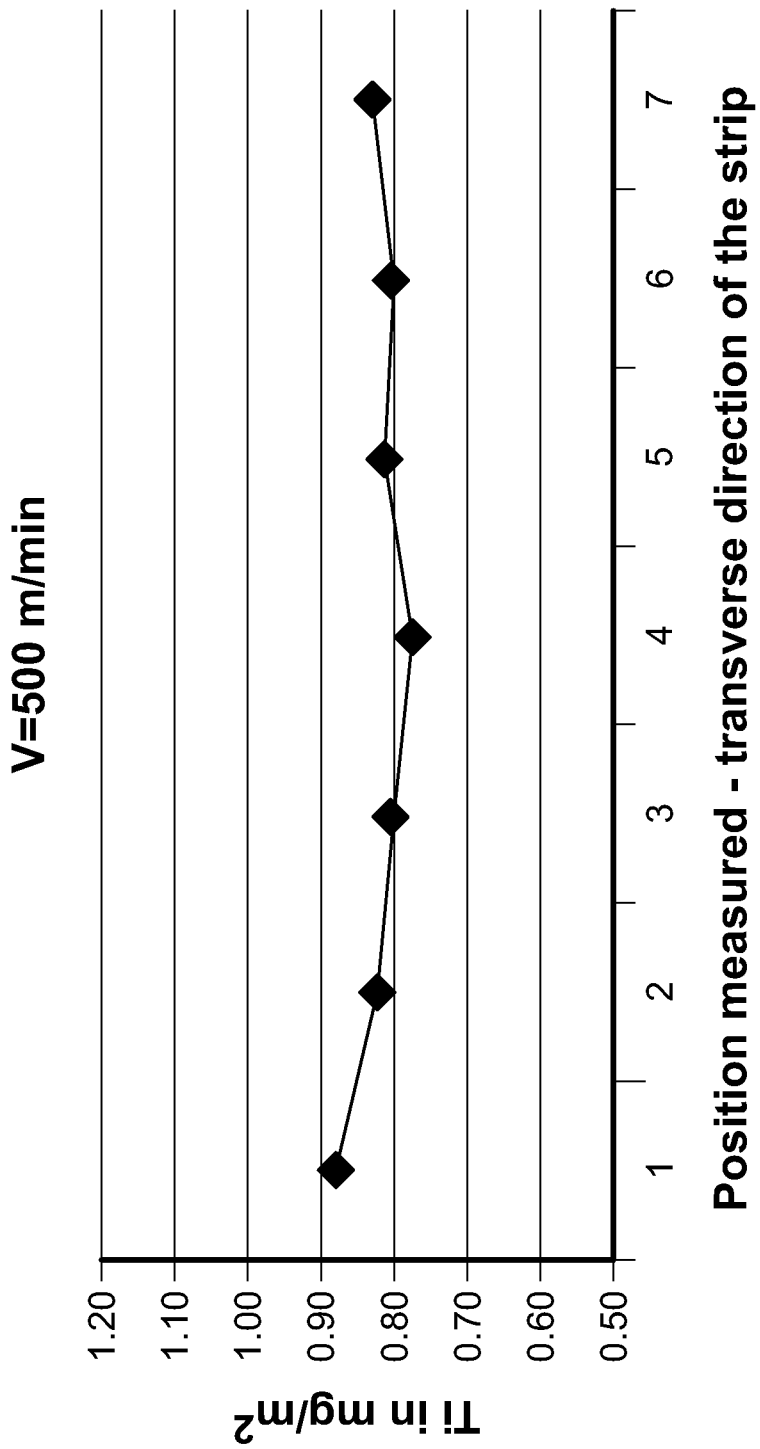
FIG. 5 is a curve representing the thickness of the wet passivation film deposited by a manufacturing method according to the invention at different points of the strip considered in the transverse direction.

FIG. 5 is a graph showing the thickness of the wet passivation film at different points on the strip, measured in different positions in the transverse direction of the strip. The passivation film is a film of Bonderite® 1456 deposited under the same conditions as those described in FIG. 4.

The thickness of the strip is expressed here in milligrams of titanium per square meter of surface because the thickness of the Bonderite® 1456 is directly related to its titanium content by weight.

This graph shows that the thickness of the Bonderite® 1456 film before drying varies between 0.78 and 0.88 mg/m² Ti from one side of the strip to the other. The method claimed by the invention therefore makes it possible to obtain a constant thickness of the passivation coating to ±0.15 mg/m² Ti.

What is claimed is:

1. An apparatus in combination with a solution comprising:
    a transfer roller;
    a coating roller contacting the transfer roller, a surface of the coating roller having a plurality of hexagonally shaped cells with a line count being from 50 to 200 lines per centimeter and a volume being from $5·10^{-6}$ to $10·10^{-6}$ m³ per square meter of the coating roller surface;
    an aqueous passivation solution; and
    a tank containing the aqueous passivation solution, the tank providing the aqueous passivation solution to the coating roller.

2. The apparatus in combination with a solution according to claim 1, wherein the transfer roller is made of an elastomer.

3. The apparatus in combination with a solution according to claim 1, wherein the coating roller includes a laser etched ceramic coating.

4. The apparatus in combination with a solution according to claim 1, wherein the tank includes a wiping device having at least one blade.

5. The apparatus in combination with a solution according to claim 1, further comprising at least one magnetic radiation gauge allowing measurement of the thickness of the passivation layer before drying.

6. The apparatus in combination with a solution according to claim 1, wherein the transfer roller directly contacts the coating roller.

7. The apparatus in combination with a solution according to claim 1, further comprising a drying unit downstream of the transfer roller.

8. The apparatus in combination with a solution according to claim 1, further comprising a strip, the transfer roller being located between the strip and the coating roller to transfer the aqueous passivation solution from the coating roller to the strip.

9. The apparatus in combination with a solution according to claim 8, wherein the strip is made of steel.

10. The apparatus in combination with a solution according to claim 1, wherein the coating roller rotates and dips into the aqueous passivation solution contained in the tank.

11. The apparatus in combination with a solution according to claim 1, further comprising a second transfer roller; a second coating roller contacting the second transfer roller, and a second tank containing the aqueous passivation solution, the second tank providing the aqueous passivation solution to the second coating roller, the first and second transfer rollers forming a nip for a strip being coated with the aqueous passivation solution.

12. A steel strip coater comprising:
    a transfer roller for contact with a steel strip;
    a coating roller directly contacting the transfer roller, a surface of the coating roller having a plurality of hexagonally shaped cells with a line count being from 50 to 200 lines per centimeter and a volume being from $5·10^{-6}$ to $10·10^{-6}$ m³ per square meter of the coating roller surface; and
    a tank for containing an aqueous passivation solution, the tank for providing the aqueous passivation solution to the coating roller.

13. The steel strip coater according to claim 12, wherein the transfer roller is made of an elastomer.

14. The steel strip coater according to claim 12, wherein the coating roller includes a laser etched ceramic coating.

15. The steel strip coater according to claim 12, wherein the tank includes a wiping device having at least one blade.

16. The steel strip coater according to claim 12, further comprising at least one magnetic radiation gauge allowing measurement of the thickness of the passivation layer before drying.

17. The steel strip coater according to claim 12, further comprising a drying unit downstream of the transfer roller.

18. The steel strip coater according to claim 12, further comprising the steel strip, the transfer roller being located between the steel strip and the coating roller.

19. The steel strip coater according to claim 12, wherein the coating roller rotates and dips into the aqueous passivation solution contained in the tank.

20. The steel strip coater according to claim 12, further comprising a second transfer roller; a second coating roller directly contacting the second transfer roller, and a second tank, the first and second transfer rollers forming a nip for the steel strip.

* * * * *